Dec. 20, 1960 E. JOHNS 2,965,031
WELL BORE DETECTOR AND PERFORATING APPARATUS
Filed Oct. 11, 1957
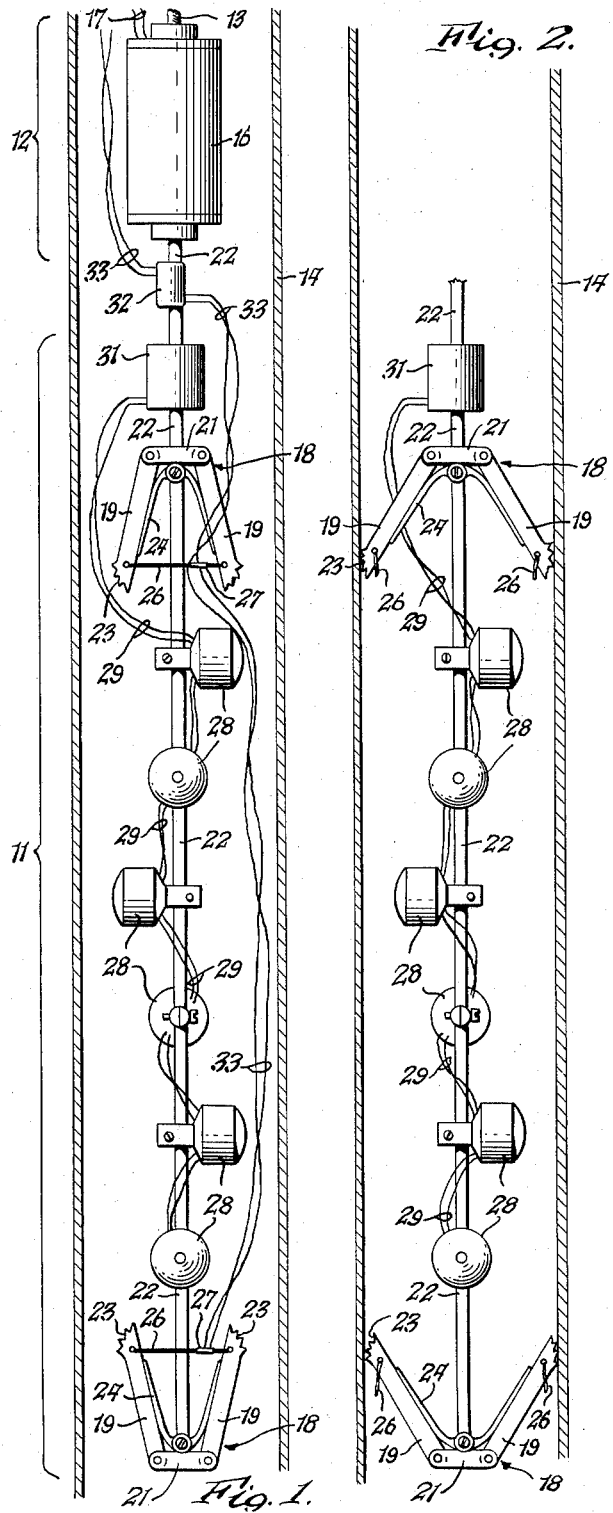
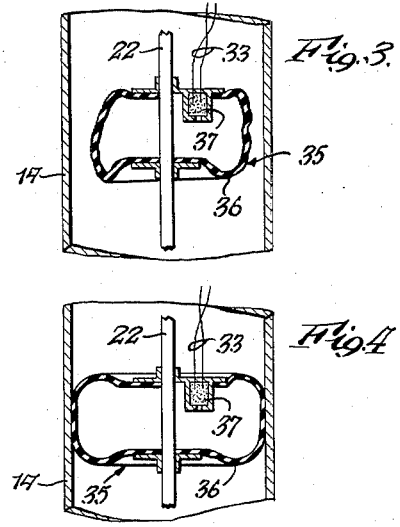
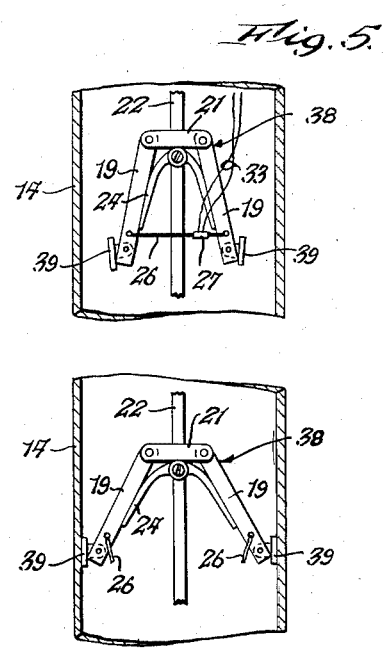
INVENTOR.
Earl Johns
BY
Popp and Sammer
Attorneys.

United States Patent Office 2,965,031
Patented Dec. 20, 1960

2,965,031

WELL BORE DETECTOR AND PERFORATING APPARATUS

Earl Johns, Tulsa, Okla., assignor, by mesne assignments, to Seismograph Service Corporation, Tulsa, Okla., a corporation of Delaware Filed Oct. 11, 1957, Ser. No. 689,670

1 Claim. (Cl. 102—21.8)

This invention relates to a means for positioning a well bore perforating gun, and more particularly to a means for positioning a perforating gun in a well bore producing zone located by use of a gamma ray detector, and removing the latter before perforation begins.

It is known in the art to use a detector, such as a gamma ray detector, combined with a perforating gun assembly for locating and perforating producing zones in a well bore. The advantage of such a combination is that it permits the locating of a producing zone in the well bore and the accurate positioning of the perforating gun within said zone, a feat which is not always easy, or possible to accomplish with other known methods especially at great depths wherein severe cable stretching is encountered.

The present invention utilizes a combination of a gamma ray detector and perforating gun, as in the case of some prior art arrangements, however, the present invention teaches the further step of removing the gamma ray detector from connection with an anchored perforating gun prior to the actual perforating operation. In such manner, certain advantages are to be had the more important being the fact that the detector is not damaged or destroyed by the explosive action of the perforating gun. Other advantages afforded by the method and means of the present invention are that the gamma ray detector can be of the more sensitive and delicate type, and may have a large optimum diameter without danger of piston effect and being blown out of the well, and furthermore, there is no need for leaving a cable in the well since it may be withdrawn before the perforating operation, hence, the need for a lubricator through which a cable is run, may be eliminated.

The main object of this invention is to provide a means for accurately positioning a well bore perforating gun.

A more specific object of this invention is to provide a means for positioning a perforating gun in a well bore producing zone located by use of a gamma ray detector, and removing the latter before perforation begins.

A further object of this invention is to provide a means for detaching a gamma ray detector from an anchored perforating gun prior to perforating operations.

Still another object of this invention is to provide a means whereby a gamma ray detector of the more sensitive and delicate type, having a large optimum diameter, may be used for more accurately locating a producing zone in a well bore.

Another object of this invention is to provide a means whereby a lubricator may be eliminated when using a well bore perforating gun.

These and further objects and features of the invention will become more apparent from the following description and accompanying drawing wherein:

Fig. 1 is a view of a combined gamma ray detector and perforating gun assemblage incorporating the principles of the invention and showing the assemblage prior to positioning in a zone of a well bore;

Fig. 2 is the same but showing the assemblage after anchoring the perforating gun in position but prior to perforating operation;

Fig. 3 is a view illustrating a modified form of anchor means used with a perforating gun assembly, and shown prior to establishment of anchoring condition;

Fig. 4 is the same as Fig. 3, but showing the anchor means thereof in anchoring condition;

Fig. 5 is a view illustrating another form of anchor means used with a perforating gun assembly, and shown prior to establishment of anchoring condition; and Fig. 6 is the same as Fig. 5, but showing the anchor means thereof in anchoring condition.

Referring now to the drawings, a representative embodiment of the invention comprises an assemblage including an expendable perforating gun portion 11 and a detector portion 12, the assemblage being affixed, or suspended from a cable 13 into a well bore casing 14, as generally used in oil or gas wells. The detector portion comprises a gamma ray detector 16, of relatively large diameter, which detector is connected by wires 17, to instruments on the ground surface for recording, or logging the strata through which the well bore passes, the technique of which is well known to those skilled in the art.

The perforating gun portion 11 includes a pair of oppositely disposed anchoring heads 18, adapted to fix the gun portion against axial movement within the casing 14. Each head 18 includes a pair of arms 19 pivotally mounted at one end to a cross head 21, the latter of which is affixed to a rod 22. The free end of each arm 19 has a curved tooth structure 23 adapted to engage the wall of the casing 14.

A resilient means in the form of springs 24 are arranged to bear against the arms 19 to swing them outwardly into engagement with the casing wall, when a tie rod 26 connected at each end to an arm 19, is severed, or broken by an explosive charge 27 secured to the tie rod. Mounted upon the rod 22, and between the anchoring heads 18, are a plurality of perforating guns, or units 28, each of which contains an explosively propelled bullet or jet stream capable of perforating the well casing 14. The guns 28, are arranged in sequential 90° positions, whereby a producing zone may be penetrated about the full periphery of the well casing. An electrical circuit, utilizing wires 29, interconnects the perforating guns 28 with a firing mechanism 31, which is adapted to fire the guns in predesignated order after the gun portion 11 is anchored in position in the well bore.

The firing mechanism 31, in simplest form may be a time-clock, however, other types may be desirable, such as one operated from the ground surface by electrical circuit, or by sound or radio signal. Another type would utilize an acid collecting dish mounted atop the firing mechanism 31, whereby acid poured from the ground surface would collect in the dish; upon eating through the dish, the acid would serve as an electrolyte to close a firing circuit.

A release means 32, affixed to the rod 22 between the detector portion 12 and perforating gun portion 11, is adapted to rupture or break the rod 22, so that the detector portion 12 may be released from the gun portion 11. The release means 32 in simplest form, may consist of an explosive charge fired by an electric circuit including wires 33 extending to the ground surface, said wires 33 also carrying current to the tie rod explosive charges 27 for the simultaneous firing thereof. Other forms of release means may be employed, such as providing a weakened notch in the rod 22 which would result in rod breakage between the detector portion 12 and the gun portion 11 when the cable 13 is suddenly jerked upwardly; or a solenoid or magnetic latch may be used.

A modified form of anchor head 35 is illustrated in Figs. 3 and 4, which consists of a rubber bag, or soft metal cylinder 36, which may be expanded into contact with the wall of the casing 14 by gas, such as may be produced by a slow burning powder 37 ignitable by electrical current carried by wires 33.

A further modified form of anchor head 38 is illustrated in Figs. 5 and 6, which is similar to the anchoring head 18 illustrated in Figs. 1 and 2, and differing therefrom in the substitution of permanent magnets 39 pivotally affixed to the ends of the arms 19, in place of the curved tooth structure 23. The modified forms of anchor heads 35 and 38 represent variations which may have advantages in use under certain conditions, and are disclosed to show other possible means for practicing or realizing the invention.

The use of the assemblage of the invention is very simple, and consists of the steps of lowering the detector portion 12 and connected perforating gun portion 11 into a well bore, receiving and recording the impulses generated by the detector 16 as it passes through varying strata until a deesired producing zone is determined, anchoring the perforating gun portion 11 by means of the anchor heads, disconnecting and removing the detector portion 16 from the well bore, and causing operation of the perforating guns 28, the latter of which may be arranged for simultaneous, or individual firing.

It will be seen from the foregoing that the application of the principles of the invention will readily provide the objectives of the invention as set forth in the early part of this disclosure.

The foregoing description has been given in detail without thought of limitation since the inventive principles involved are capable of assuming other physical embodiments without departing from the spirit of the invention and the scope of the appended claim.

What is claimed is:

Apparatus to be lowered into a well bore to detect a particular formation surrounding a portion of the well bore and to perforate said portion, comprising a cable, a detector fixed to the lower end of said cable, a vertically elongated perforating gun body arranged below said detector, a series of horizontally directed explosive guns mounted on said perforating gun body, a rupturable connection suspending said perforating gun body from said detector, anchor members movably mounted on said perforating gun body and projectable radially therefrom into anchoring engagement with the wall of said well bore to support said perforating gun body against movement lengthwise of said bore, means simultaneously projecting said anchor members and rupturing said rupturable connection to anchor said perforating gun body at said particular formation and to free said detector for removal from the well bore by elevating said cable, and a detonating mechanism mounted on said perforating gun body and operatively connected to said series of guns on said anchored perforating gun body.

References Cited in the file of this patent

UNITED STATES PATENTS

| | | |
|---|---|---|
| 1,875,583 | Fox | Sept. 6, 1932 |
| 2,020,410 | Greene | Nov. 12, 1935 |
| 2,228,623 | Ennis | Jan. 14, 1941 |
| 2,233,930 | Witt | Mar. 4, 1941 |
| 2,679,899 | Osborn | June 1, 1954 |
| 2,796,023 | Abendroth | June 18, 1957 |